United States Patent
Sun et al.

(10) Patent No.: US 10,652,070 B2
(45) Date of Patent: May 12, 2020

(54) SYNCHRONIZATION SIGNAL SENDING METHOD AND RECEIVING METHOD, AND APPARATUS

(71) Applicant: HUAWEI TECHNOLOGIES CO., LTD., Shenzhen, Guangdong (CN)

(72) Inventors: Hao Sun, Beijing (CN); Zheng Chen, Beijing (CN); Yan Cheng, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/355,024

(22) Filed: Mar. 15, 2019

(65) Prior Publication Data
US 2019/0215219 A1 Jul. 11, 2019

Related U.S. Application Data

(63) Continuation of application No. PCT/CN2017/103862, filed on Sep. 28, 2017.

(30) Foreign Application Priority Data

Oct. 10, 2016 (CN) .......................... 2016 1 0884855

(51) Int. Cl.
*H04L 27/26* (2006.01)
*H04L 5/00* (2006.01)
(Continued)

(52) U.S. Cl.
CPC ........ *H04L 27/2686* (2013.01); *H04L 5/0007* (2013.01); *H04L 5/0048* (2013.01);
(Continued)

(58) Field of Classification Search
None
See application file for complete search history.

(56) References Cited

U.S. PATENT DOCUMENTS

| 2009/0135802 A1* | 5/2009 | Haga ................... H04L 27/2647 370/350 |
| 2012/0120911 A1 | 5/2012 | Miyoshi et al. |

(Continued)

FOREIGN PATENT DOCUMENTS

| CN | 1980205 A | 6/2007 |
| CN | 101527595 A | 9/2009 |

(Continued)

OTHER PUBLICATIONS

Huawei, HiSilicon,"Support of flexible bandwidth",3GPP TSG RAN WG1 Meeting #86bis R1-1608841,Lisbon, Portugal, Oct. 10-14, 2016,total 6 pages.

(Continued)

*Primary Examiner* — Anh Ngoc M Nguyen
(74) *Attorney, Agent, or Firm* — Fish & Richardson P.C.

(57) ABSTRACT

This application provides a synchronization signal sending method and receiving method, and an apparatus. In the method, a base station determines a frequency domain position of a target frequency resource based on a frequency interval of synchronization channels, wherein the frequency interval of synchronization channels is $2^m$ times a predefined frequency resource of a physical resource block, and m is a preset nonnegative integer. The base station sends a synchronization signal by using the target frequency resource.

27 Claims, 5 Drawing Sheets

200

Determine a target frequency resource, where a frequency domain position of the target frequency resource is determined based on a frequency interval of synchronization channels, the frequency interval of synchronization channels is $2^m$ times a predefined frequency band width of a frequency resource in a physical resource block, and *m* is a preset nonnegative integer — 210

Send a synchronization signal by using the target frequency resource — 220

(51) Int. Cl.
*H04W 28/02* (2009.01)
*H04W 56/00* (2009.01)

(52) U.S. Cl.
CPC ...... *H04L 27/2672* (2013.01); *H04L 27/2676* (2013.01); *H04W 28/02* (2013.01); *H04W 56/00* (2013.01)

(56) References Cited

U.S. PATENT DOCUMENTS

| | | | |
|---|---|---|---|
| 2013/0250863 | A1 | 9/2013 | Nogami et al. |
| 2014/0177624 | A1 | 6/2014 | Miyoshi et al. |
| 2014/0307689 | A1* | 10/2014 | Kishiyama ............ H04W 16/32 370/329 |
| 2015/0004972 | A1 | 1/2015 | Nielsen et al. |
| 2015/0016239 | A1 | 1/2015 | Yi et al. |
| 2016/0112998 | A1 | 4/2016 | Jöngren et al. |
| 2017/0311321 | A1* | 10/2017 | Kakishima ............ H04W 16/28 |
| 2018/0263049 | A1 | 9/2018 | Seo et al. |

FOREIGN PATENT DOCUMENTS

| | | |
|---|---|---|
| CN | 102014462 A | 4/2011 |
| CN | 102209060 A | 10/2011 |
| CN | 102752859 A | 10/2012 |
| CN | 103188765 A | 7/2013 |
| CN | 103563273 A | 2/2014 |
| CN | 104205947 A | 12/2014 |
| CN | 104243118 A | 12/2014 |

OTHER PUBLICATIONS

International Search Report and Written Opinion issued in International Application No. PCT/CN2017/103862 dated Dec. 28, 2017, 9 pages.
R1-1609701—Panasonic, "NR synchronization signal and DL broadcast signal," 3GPP TSG RAN WG1 Meeting #86bis, Lisbon, Portugal, XP51158568, Oct. 10-14, 2016, 4 pages.
R1-164870—ETRI, "Discussion on numerology for NR," 3GPP TSG RAN WG1 Meeting #85, Nanjing, China, XP51089890, May 23-27, 2016, 5 pages.
Extended European Search Report and Written Opinion issued in European Application No. 17859927.0 dated Aug. 27, 2019, 8 pages.
Office Action issued in Chinese Application No. 201780062826.2 dated Mar. 4, 2020, 33 pages (with English translation).

* cited by examiner

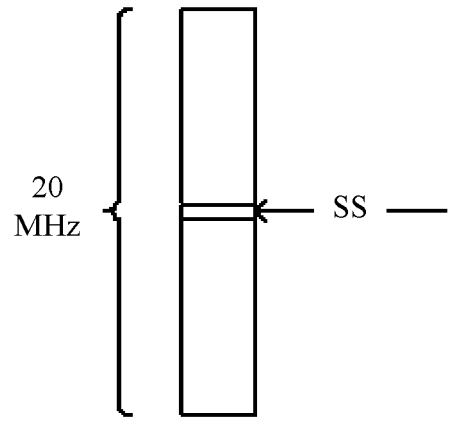

Determine a target frequency resource, where a frequency domain position of the target frequency resource is determined based on a frequency interval of synchronization channels, the frequency interval of synchronization channels is $2^m$ times a predefined frequency band width of a frequency resource in a physical resource block, and $m$ is a preset nonnegative integer ~ 210

Send a synchronization signal by using the target frequency resource ~ 220

Obtain a target frequency resource, where a frequency domain position of the target frequency resource is determined based on a frequency interval of synchronization channels, the frequency interval of synchronization channels is $2^m$ times a predefined frequency band width of a frequency resource in a physical resource block, and $m$ is a preset nonnegative integer ~ 410

Receive, based on the target frequency resource, a synchronization signal sent by a base station ~ 420

FIG. 5

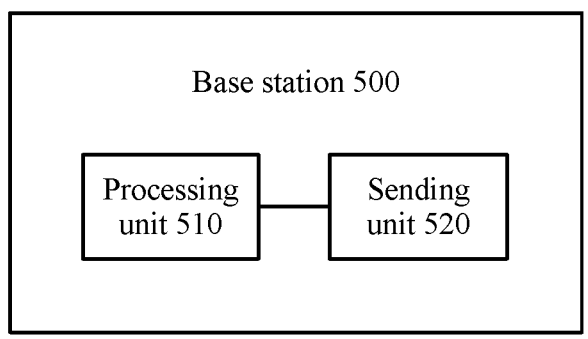

FIG. 6

SYNCHRONIZATION SIGNAL SENDING METHOD AND RECEIVING METHOD, AND APPARATUS

CROSS-REFERENCE TO RELATED APPLICATIONS

This application is a continuation of International Application No. PCT/CN2017/103862, filed on Sep. 28, 2017, which claims priority to Chinese Patent Application No. 201610884855.4, filed on Oct. 10, 2016, The disclosures of the aforementioned applications are hereby incorporated by reference in their entireties.

TECHNICAL FIELD

This application relates to the communication field, and in particular, to a synchronization signal sending method and receiving method, and an apparatus.

BACKGROUND

Currently, in a Long Term Evolution (LTE) system, a synchronization channel used for cell synchronization and cell search is located at a center of a system bandwidth. Using a system whose bandwidth is 20 MHz as an example, a frequency domain position of the synchronization channel is shown in FIG. 1. In the LTE system, before accessing the system, UE needs to search for a synchronization signal (SS). After a synchronization signal is found, the UE can determine a frequency domain position of a center frequency of the system and timing synchronization information and frequency synchronization information. To reduce complexity of searching for a synchronization signal by the UE, an LTE protocol defines that a synchronization channel needs to be located at a frequency that is an integer multiple of 100 kHz in frequency domain, for example, 2 MHz, 2.1 MHz, or 2.2 MHz. Equal intervals of 100 kHz are channel rasters of the synchronization channel in the LTE protocol.

In the future Fifth Generation (5G) mobile communication system, the system may need to send synchronization signals in a same time resource in a frequency division manner because of requirements such as multiple service co-existence or multi-beam sending, and all the synchronization signals need to be mapped to a candidate frequency domain position set of a synchronization channel. If the candidate frequency domain position set of the synchronization channel still uses the design of 100 kHz channel rasters in LTE, 100 kHz does not match a size of a frequency domain resource occupied by a physical resource block (PRB) in the 5G system, and therefore, it needs to ensure that all the synchronization signals align with boundaries of PRBs during mapping of synchronization signals, so as to minimize physical resource block overheads of the synchronization signals in the system. In this case, available mapping positions for synchronization signals are greatly limited, and an actual value of the channel raster of the synchronization channel is a least common multiple of a frequency bandwidth of the PRB and 100 kHz. In an example that the PRB occupies 180 kHz, an actual value of the channel raster of the synchronization channel is 900 kHz, and the synchronization signals need to be mapped to a position determined based on the channel raster of 900 kHz. This greatly limits available frequency domain mapping positions for the synchronization signal.

SUMMARY

Embodiments of this application provide a synchronization signal sending method and receiving method, and an apparatus, so as to increase available frequency domain mapping positions for a synchronization signal.

According to a first aspect, a synchronization signal sending method is provided, including:

determining a target frequency resource, where a frequency domain position of the target frequency resource is determined based on a frequency interval of synchronization channels, the frequency interval of synchronization channels is $2^m$ times a predefined frequency bandwidth of a frequency resource of a physical resource block, and m is a preset nonnegative integer; and sending a synchronization signal by using the target frequency resource.

The frequency domain position of the frequency resource occupied by the synchronization signal is determined based on the frequency interval of synchronization channels, and the frequency interval of synchronization channels is $2^m$ times the predefined frequency bandwidth of the frequency resource of a physical resource block. This is for the benefit of increasing a quantity of candidate frequency resources of synchronization signals, thereby increasing available frequency domain mapping positions for the synchronization signal.

In a possible implementation, a starting frequency domain position or an ending frequency domain position of the target frequency resource aligns with a boundary of a physical resource block of a data channel.

This can prevent the synchronization signal from occupying an extra physical resource block, and reduce physical resource block overheads of the synchronization signal in a system, thereby improving physical resource block utilization of the system.

In a possible implementation, the frequency domain position of the target frequency resource is determined based on the frequency interval of synchronization channels and a preset frequency domain position offset.

The available frequency domain mapping positions for the synchronization signal can be further increased by flexibly defining a value of the frequency domain position offset.

In a possible implementation, the frequency domain position of the target frequency resource is determined according to the following relational expression:

$p = \text{offset} + n \ast \text{frequency\_interval}$, where p is the frequency domain position of the target frequency resource, offset is the frequency domain position offset, n is a preset integer, and frequency_interval is the frequency interval of synchronization channels.

In a possible implementation, n is an integer in an integer set that is determined based on a frequency band used by a system.

In this way, candidate frequency resources of the synchronization signal can be set flexibly based on the frequency band used by the system, thereby further increasing the available frequency domain mapping positions for the synchronization signal.

In a possible implementation, there is a correspondence between the frequency band used by the system and the frequency domain position offset and/or the frequency interval of synchronization channels, and a value range of m is determined based on the frequency band used by the system.

In this way, candidate frequency resources of the synchronization signal can be set flexibly based on the frequency band used by the system, thereby further increasing the available frequency domain mapping positions for the synchronization signal.

In a possible implementation, the frequency domain position offset is 0 kHz, −7.5 kHz, or 7.5 kHz.

In some embodiments, the frequency domain position offset is −7.5 kHz or 7.5 kHz, so that an LTE system can coexist with a future system (for example, a 5G system).

In a possible implementation, the preset frequency bandwidth of the frequency resource of a physical resource block meets the following relational expression:

$$F_{RB}=SCS*N_{SC}^{RB},$$

where $F_{RB}$ is the predefined frequency bandwidth of the frequency resource of a physical resource block, SCS is a preset subcarrier spacing of a physical resource block, and $N_{SC}^{RB}$ is a predefined subcarrier quantity of a physical resource block.

In a possible implementation, the predefined subcarrier spacing of a physical resource block is 15 kHz, and the predefined subcarrier quantity of a physical resource block is 12 or 16.

In a possible implementation, the frequency domain position of the target frequency resource includes a frequency domain position of a center frequency of the frequency resource, a frequency domain position of a starting frequency of the frequency resource, or a frequency domain position of an ending frequency of the frequency resource.

According to a second aspect, a synchronization signal receiving method is provided, including:

obtaining a target frequency resource, where a frequency domain position of the target frequency resource is determined based on a frequency interval of synchronization channels, the frequency interval of synchronization channels is $2^m$ times a predefined frequency bandwidth of a frequency resource of a physical resource block, and m is a preset nonnegative integer; and receiving, based on the target frequency resource, a synchronization signal from a base station.

The frequency domain position of the frequency resource occupied by the synchronization signal is determined based on the frequency interval of synchronization channels, and the frequency interval of synchronization channels is $2^m$ times the preset frequency bandwidth of the frequency resource of a physical resource block. This is for the benefit of increasing a quantity of candidate frequency resources of the synchronization signal, thereby increasing available frequency domain mapping positions for the synchronization signal.

In a possible implementation, a starting frequency domain position or an ending frequency domain position of the target frequency resource aligns with a boundary of a physical resource block of a data channel.

This can prevent the synchronization signal from occupying an extra physical resource block, and reduce physical resource block overheads of the synchronization signal in a system, thereby improving physical resource block utilization of the system.

In a possible implementation, the frequency domain position of the target frequency resource is determined based on the frequency interval of synchronization channels and a preset frequency domain position offset.

The available frequency domain mapping positions for the synchronization signal can be further increased by flexibly defining a value of the frequency domain position offset.

In a possible implementation, the frequency domain position of the target frequency resource is determined according to the following relational expression:

$$p=\text{offset}+n*\text{frequency interval},$$

where p is the frequency domain position of the target frequency resource, offset is the frequency domain position offset, n is a preset integer, and frequency_interval is the frequency interval of synchronization channels.

In a possible implementation, n is an integer in an integer set that is determined based on a frequency band used by a system.

In this way, candidate frequency resources of the synchronization signal can be set flexibly based on the frequency band used by the system, thereby further increasing the available frequency domain mapping positions for the synchronization signal.

In a possible implementation, there is a correspondence between the frequency band used by the system and the frequency domain position offset and/or the frequency interval of synchronization channels, and a value range of m is determined based on the frequency band used by the system.

In this way, candidate frequency resources of the synchronization signal can be set flexibly based on the frequency band used by the system, thereby further increasing the available frequency domain mapping positions for the synchronization signal.

In a possible implementation, the frequency domain position offset is 0 kHz, −7.5 kHz, or 7.5 kHz.

In some embodiments, the frequency domain position offset is −7.5 kHz or 7.5 kHz, so that an LTE system can coexist with a future system (for example, a 5G system).

In a possible implementation, the predefined frequency bandwidth of the frequency resource of a physical resource block meets the following relational expression:

$$F_{RB}=SCS*N_{SC}^{RB},$$

where $F_{RB}$ is the predefined frequency bandwidth of the frequency resource of a physical resource block, SCS is a predefined subcarrier spacing of a physical resource block, and $N_{SC}^{RB}$ is a predefined subcarrier quantity of a physical resource block.

In a possible implementation, the predefined subcarrier spacing of a physical resource block is 15 kHz, and the predefined subcarrier quantity of a predefined physical resource block is 12 or 16.

In a possible implementation, the frequency domain position of the target frequency resource includes a frequency domain position of a center frequency of the frequency resource, a frequency domain position of a starting frequency of the frequency resource, or a frequency domain position of an ending frequency of the frequency resource.

According to a third aspect, a base station is provided, where the base station is configured to implement the method according to any one of the first aspect or the foregoing possible implementations of the first aspect.

Specifically, the base station may include units configured to perform the method according to any one of the first aspect or the possible implementations of the first aspect.

According to a fourth aspect, a terminal device is provided, where the terminal device is configured to implement the method according to any one of the second aspect or the foregoing possible implementations of the second aspect.

Specifically, the terminal device may include units configured to perform the method according to any one of the second aspect or the possible implementations of the second aspect.

According to a fifth aspect, a base station is provided, including a processor, a transmitter, a memory, and a bus system, where the processor, the transmitter, and the memory are connected by using the bus system, the memory is configured to store instructions or codes, and the processor is configured to execute the instructions or the codes stored in the memory, so that the base station performs the method according to any one of the first aspect or the possible implementations of the first aspect.

According to a sixth aspect, a terminal device is provided, including a processor, a receiver, a memory, and a bus system, where the processor, the receiver, and the memory are connected by using the bus system, the memory is configured to store instructions or codes, and the processor is configured to execute the instructions or the codes stored in the memory, so that the terminal device performs the method according to any one of the second aspect or the possible implementations of the second aspect.

According to a seventh aspect, a computer-readable storage medium is provided, where the computer readable storage medium stores a program, and the program enables a base station to perform the method according to any one of the first aspect or the possible implementations of the first aspect.

According to an eighth aspect, a computer-readable storage medium is provided, where the computer readable storage medium stores a program, and the program enables a terminal device to perform the method according to any one of the second aspect or the possible implementations of the second aspect.

BRIEF DESCRIPTION OF DRAWINGS

FIG. 1 is a schematic diagram of a frequency domain position of a synchronization channel in a 20 MHz system;

FIG. 2 is a schematic flowchart of a synchronization signal sending method according to an embodiment of this application;

FIG. 3 is a schematic diagram of a frequency domain mapping position of a synchronization signal;

FIG. 4 is another schematic diagram of a frequency domain mapping position of a synchronization signal;

FIG. 5 is a schematic flowchart of a synchronization signal receiving method according to an embodiment of this application;

FIG. 6 is a schematic structural diagram of a base station according to an embodiment of this application;

DESCRIPTION OF EMBODIMENTS

Figure 7:
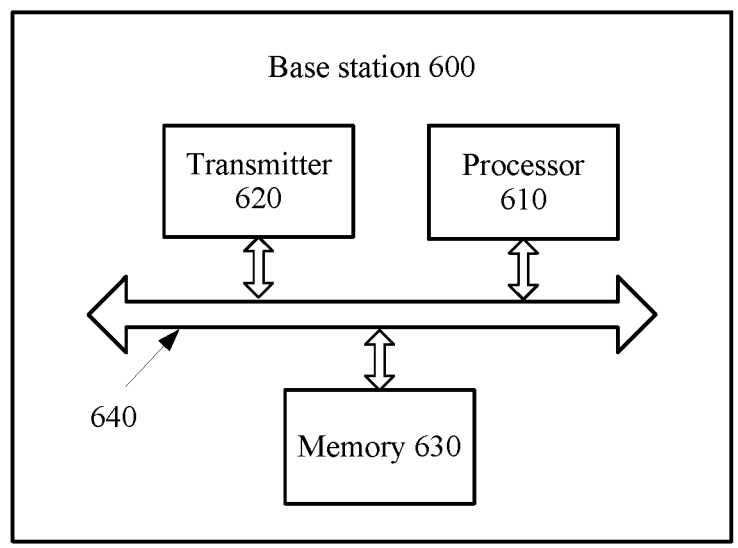
FIG. 7 is a schematic structural diagram of a base station according to another embodiment of this application.

The following describes the technical solutions in the embodiments of this application with reference to accompanying drawings of the embodiments of this application.

It should be understood that the technical solutions of this application may be applied to various communication systems, for example, Wireless Fidelity (WiFi), Worldwide Interoperability for Microwave Access (WiMAX), a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an Advanced Long Term Evolution (LTE-A) system, a Universal Mobile Telecommunications System (UMTS), and cellular systems related to the 3rd Generation Partnership Project (3GPP). The embodiments of this application set no limitation. However, for ease of description, an LTE network is used as an example for description in the embodiments of this application.

The embodiments of this application may be used for wireless networks of different standards. Radio access networks in different systems may include different network elements. For example, a radio access network of Long Term Evolution (LTE) and LTE-A includes an evolved NodeB (eNB), and a radio access network of Wideband Code Division Multiple Access (WCDMA) includes a radio network controller (RNC) and a NodeB. Similarly, other wireless networks such as Worldwide Interoperability for Microwave Access (WiMax) may also use a solution similar to the embodiments of this application, except that a related module in a base station system may vary. The embodiments of this application set no limitation. However, for ease of description, a base station is used as an example for description in the following embodiments.

It should be further understood that in the embodiments of this application, a terminal device is also referred to as user equipment (UE), a mobile station (MS), a mobile terminal, or the like. The terminal may communicate with one or more core networks via a radio access network (RAN). For example, the terminal may be a mobile phone (or referred to as a "cellular" phone), a computer having a communication function, or the like. For example, the terminal may also be a portable, pocket-sized, handheld, computer built-in, or in-vehicle mobile apparatus.

It should be noted that a frequency interval of synchronization channels may be a frequency interval between center frequencies of two synchronization channels, may be a frequency interval between starting frequencies of two synchronization channels, or may be a frequency interval between ending frequencies of two synchronization channels.

FIG. 2 is a schematic flowchart of a synchronization signal sending method 200 according to an embodiment of this application. It should be understood that the method 200 may be performed by a base station. As shown in FIG. 2, the method 200 includes the following content.

210. Determine a target frequency resource, where a frequency domain position of the target frequency resource is determined based on a frequency interval of synchronization channels, the frequency interval of synchronization channels is $2^m$ times a predefined frequency bandwidth of a frequency resource in a physical resource block, and m is a preset nonnegative integer.

Optionally, the base station may select one or more frequency resources from a synchronization channel frequency resource set as the target frequency resource.

In some embodiments, an interval of at least two frequency resources in the synchronization channel frequency resource set is an integer multiple of the frequency interval of synchronization channels.

In some embodiments, a synchronization signal frequency resource set may include a plurality of frequency resources. A frequency domain position of at least one frequency resource in the plurality of frequency resources is determined based on the frequency interval of synchronization channels defined in this embodiment of this application. Alternatively, frequency domain positions of other frequency resources in the plurality of frequency resources may be defined according to other preset rules. This embodiment of this application sets no limitation thereto.

For example, alternatively, frequency domain positions of some frequency resources in the frequency resource set may be determined based on a frequency interval of synchronization channels in the prior art. For example, an LTE protocol defines that a synchronization channel needs to be located at a frequency that is an integer multiple of 100 kHz in frequency domain, for example, 2 MHz, 2.1 MHz or 2.2 MHz.

In some embodiments, if the target frequency resource includes one or more frequency resources, the one or more frequency resources may be determined based on the frequency interval of synchronization channels defined in this embodiment of this application or may be determined according to another preset rule.

220. Send a synchronization signal by using the target frequency resource.

In this embodiment of this application, the target frequency resource is determined based on the frequency interval of synchronization channels, and the frequency interval of synchronization channels is $2^m$ times the predefined frequency bandwidth of the frequency resource of a physical resource block. For example, the predefined frequency bandwidth of the frequency resource of a physical resource block is 180 kHz, and m=0. Then, a value of the frequency interval of synchronization channels is 180 kHz. Apparently, this embodiment of this application is favorable for increasing a quantity of candidate frequency resources of the synchronization signal.

Therefore, in this embodiment of this application, the frequency domain position of the frequency resource occupied by the synchronization signal is determined based on the frequency interval of synchronization channels, and the frequency interval of synchronization channels is $2^m$ times the predefined frequency bandwidth of the frequency resource of a physical resource block. This is for the benefit of increasing the quantity of candidate frequency resources of the synchronization signal, thereby increasing available of frequency domain mapping positions for the synchronization signal.

Optionally, a starting frequency domain position or an ending frequency domain position of the target frequency resource aligns with a boundary of a physical resource block of a data channel. This can prevent the synchronization signal from occupying an extra physical resource block, and reduce physical resource block overheads of the synchronization signal in a system, thereby improving physical resource block utilization of the system.

Figures 3, 4:
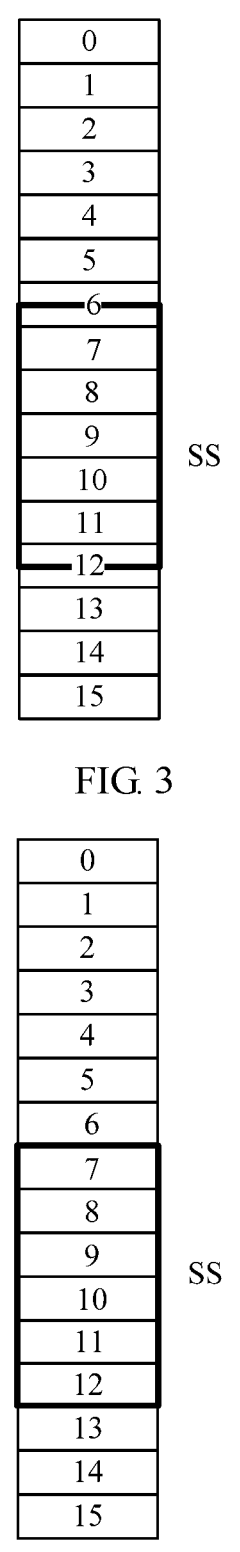

As shown in FIG. 3, if the starting frequency domain position of the frequency resource of the synchronization signal does not align with a boundary of a physical resource block 6 of the data channel, the synchronization signal occupies physical resource blocks whose indices are 6 to 12. As shown in FIG. 4, if the starting frequency domain position of the frequency resource of the synchronization signal aligns with a boundary of the physical resource block 7 of the data channel, the same synchronization signal occupies physical resource blocks whose indices are 7 to 12. Apparently, aligning the starting frequency domain position of the frequency resource with the boundary of the physical resource block of the data channel can prevent occupation of an extra physical resource block. Similarly, a same effect can also be achieved by aligning the ending frequency domain position of the frequency resource with the boundary of the physical resource block of the data channel. Details are not described herein again.

In some embodiments, the predefined physical resource block may be the same as the physical resource block of the data channel. In some other embodiments, alternatively, the predefined physical resource block may be different from the physical resource block of the data channel. This embodiment of this application sets no limitation thereto.

In some embodiments, the frequency interval of synchronization channels meets the following relational expression: raster=$F_{FB}*2^m$, where $F_{RB}$ is the predefined frequency bandwidth of the frequency resource of the physical resource block.

Optionally, there is a correspondence between a value range of m and a frequency band used by a system. For example, a plurality of frequency bands used by the system correspond to a same value range of m, each frequency band used by the system corresponds to one value range of m, or each frequency band used by the system corresponds to a plurality of value ranges of m. Before sending the synchronization signal, the base station may select a determined value from the value range of m, so as to determine the target frequency resource.

The frequency band used by the system may be a 2G frequency band, a 3G frequency band, a 4G frequency band, a 5G frequency band, or the like. This embodiment of this application sets no limitation thereto.

In this embodiment of this application, the predefined frequency bandwidth of the frequency resource of the physical resource block is determined by a predefined subcarrier spacing and at least one predefined subcarrier.

For example, the predefined frequency bandwidth of the frequency resource of the physical resource block meets the following relational expression:

$$F_{RB}=SCS*N_{SC}^{RB}, \text{ where}$$

$F_{RB}$ is the predefined frequency bandwidth of the frequency resource of the physical resource block, SCS is a predefined subcarrier spacing of the physical resource block, and $N_{SC}^{RB}$ is a predefined subcarrier quantity of the physical resource block.

In other words, the predefined physical resource block in this embodiment of this application consists of $N_{SC}^{RB}$ subcarriers in frequency domain.

In some embodiments, the predefined subcarrier spacing of the physical resource block is 15 kHz, and the predefined subcarrier quantity of the physical resource block is 12 or 16. Correspondingly, the predefined frequency bandwidth of the frequency resource of the physical resource block is 180 kHz or 240 kHz.

It should be understood that the predefined subcarrier spacing and the predefined subcarrier quantity of the physical resource block may alternatively be another value. This embodiment of this application sets no limitation thereto.

For example, the predefined subcarrier spacing of the physical resource block may alternatively be 30 kHz, 60 kHz, or the like.

It should be noted that the predefined physical resource block in this embodiment of this application and a physical resource block in a future system may be the same or may be different.

For example, in the future system (such as a 5G system), a plurality of subcarrier spacings may be supported. When the system enables one subcarrier spacing in a same time resource, the value of the frequency interval of synchronization channels may be a frequency bandwidth, determined based on the subcarrier spacing, of a physical resource block. In other words, in such a system, m has a unique value. When the system enables a plurality of subcarrier spacings in a same time resource for frequency division multiplexing, a frequency interval of synchronization channels mapped to ranges of different subcarrier spacings is a frequency bandwidth of one PRB in a current mapping range. In such a system, a value of m is not unique.

The following uses an example in which one physical resource block includes 12 subcarriers for description. For example, the system enables subcarrier spacings of 15 kHz and 30 kHz in a same time resource. Then, a frequency interval of synchronization channels mapped to a range of the 15 kHz subcarrier spacing may be 180 kHz (where a corresponding value of m is 0), and a frequency interval of synchronization channels mapped to a range of the 30 kHz subcarrier spacing may be 360 kHz (where a corresponding value of m is 1).

Optionally, the frequency domain position of the target frequency resource is determined based on the frequency interval of synchronization channels and a preset frequency domain position offset.

The available frequency domain mapping positions for the synchronization signal can be further increased by flexibly defining a value of the frequency domain position offset.

Optionally, the frequency domain position of the target frequency resource is determined according to the following relational expression:

$$p = \text{offset} + n * \text{frequency\_interval, where}$$

p is the frequency domain position of the target frequency resource, offset is the frequency domain position offset, n is a preset integer, and frequency_interval is the frequency interval of synchronization channels.

Optionally, the frequency domain position offset may be 0 kHz, −7.5 kHz, or 7.5 kHz.

For example, when the 5G system is not deployed with an LTE system continuously in a same frequency band, impact of coexistence with LTE may not be considered for the 5G system, and a value of the frequency domain position offset may be 0 kHz. Alternatively, the frequency domain position offset may be other predefined values due to other deployment flexibility considerations.

When contiguous carrier aggregation is performed between the 5G system and the LTE system, subcarrier orthogonality with the LTE system needs to be considered in the 5G system. In a design of the LTE system, a blank subcarrier is reserved at a center of a frequency band. A center of the system frequency band is located at a center of the blank subcarrier in practice. Therefore, boundaries of all subcarriers of the LTE system is at (n×100 kHz±7.5 kHz). During LTE-to-LTE contiguous carrier aggregation, both carriers have an offset of 7.5 kHz. Therefore, subcarrier orthogonality can be implemented provided that the frequency interval of synchronization channels meets 300 kHz (which is a least common multiple of 100 kHz and the subcarrier spacing of 15 kHz). However, reservation of the blank subcarrier is cancelled in the 5G system. Therefore, during contiguous carrier aggregation between the 5G system and the LTE system, the offset of 7.5 kHz needs to be additionally compensated for. After the offset of 7.5 kHz is compensated for, a frequency interval of synchronization channels of the LTE system meets a condition of 300 kHz. In addition, in this embodiment of this application, all frequency intervals of synchronization channels are integer multiples of 15 kHz. Therefore, this can ensure the subcarrier orthogonality between the 5G system and the LTE system.

Therefore, the frequency domain position offset of −7.5 kHz or 7.5 kHz enables the LTE system to coexist with the future system (for example, the 5G system).

Optionally, there is a correspondence between a value range of n and the frequency band used by the system. For example, at least one integer set may be determined based on the frequency band used by the system. Before sending the synchronization signal, the base station may select, as a value of n, an integer from an integer set corresponding to a frequency band currently used by the system. In other words, n is an integer in the integer set that is determined based on the frequency band used by the system.

In this way, candidate frequency resources of the synchronization signal can be set flexibly based on the frequency band used by the system, further increasing the available frequency domain mapping positions for the synchronization signal.

Optionally, there is a correspondence between the frequency domain position offset and the frequency band used by the system. For example, a plurality of frequency bands used by the system correspond to a same frequency domain position offset; each frequency band used by the system corresponds to one frequency domain position offset; or each frequency band used by the system corresponds to a plurality of frequency domain position offsets, and before sending the synchronization signal, the base station may select one frequency domain position offset from the plurality of frequency domain position offsets, to determine the target frequency resource.

Optionally, there is a correspondence between the frequency interval of synchronization channels and the frequency band used by the system. For example, a plurality of frequency bands used by the system correspond to a same frequency interval of synchronization channels; each frequency band used by the system corresponds to one frequency interval of synchronization channels; or each frequency band used by the system corresponds to a plurality of frequency intervals of synchronization channels, and before sending the synchronization signal, the base station may select one frequency interval of synchronization channels from the plurality of frequency intervals of synchronization channels, to determine the target frequency resource.

In some embodiments, there may be no association relationship between the frequency domain position offset and the frequency interval of synchronization channels. For example, the correspondence between the frequency domain position offset and the frequency band used by the system does not affect the correspondence between the frequency interval of synchronization channels and the frequency band used by the system. For example, a 2G frequency band and a 3G frequency band used by the system respectively correspond to different frequency domain position offsets but correspond to a same frequency interval of synchronization channels.

In some embodiments, there may be a correspondence between the frequency band used by the system and both the frequency domain position offset and the frequency interval of synchronization channels. For example, a 4G frequency band used by the system corresponds to a first frequency domain position offset and a first frequency interval of synchronization channels, and a 3G frequency band used by the system corresponds to a second frequency domain position offset and a second frequency interval of synchronization channels, where the first frequency domain position offset is different from the second frequency domain position offset, and the first frequency interval of synchronization channels is different from the second frequency interval of synchronization channels.

Optionally, the frequency domain position of the target frequency resource includes a frequency domain position of a center frequency of the target frequency resource.

It should be understood that the frequency domain position of the target frequency resource may further include a frequency domain position of a starting frequency of the target frequency resource or a frequency domain position of an ending frequency of the target frequency resource. This embodiment of this application sets no limitation thereto.

In this embodiment of this application, a frequency domain position of a frequency resource may be indicated by using a frequency corresponding to the frequency resource, or may be indicated by using a number or an index corresponding to the frequency resource.

FIG. 5 is a schematic flowchart of a synchronization signal detection method 400 according to another embodiment of this application. It should be understood that the method 400 may be performed by a terminal device. The method 400 corresponds to the method 200, and corresponding content is properly omitted herein. As shown in FIG. 5, the method 400 includes the following content.

410. Obtain a target frequency resource, where a frequency domain position of the target frequency resource is determined based on a frequency interval of synchronization channels, the frequency interval of synchronization channels is $2^m$ times a predefined frequency bandwidth of a frequency resource of a physical resource block, and m is a preset nonnegative integer.

Optionally, the target frequency resource may be obtained from a preconfigured frequency resource set of a synchronization signal.

It should be understood that the frequency resource set of the synchronization signal may be preconfigured in the terminal device in a predefined manner or may be preconfigured in the terminal device by a base station.

For example, that the terminal device obtains the frequency resource set of the synchronization signal may include the following: The terminal device receives resource configuration information from the base station, and obtains a resource configuration set of the synchronization signal based on the resource configuration information that is of the synchronization signal and that is sent by the base station.

420. Receive, based on the target frequency resource, a synchronization signal from a base station.

For example, before accessing a system, the terminal device first obtains the frequency resource set of the synchronization signal. The terminal device cannot have knowledge of specific frequency resources in the frequency resource set that are used by the base station to send the synchronization signal. Therefore, the terminal device performs, based on the frequency resource set of the synchronization signal, blind detection on the synchronization signal sent by the base station, until receiving, by using the target frequency resource, the synchronization signal from the base station.

In this embodiment of this application, the frequency domain position of the frequency resource occupied by the synchronization signal is determined based on the frequency interval of synchronization channels, and the frequency interval of synchronization channels is $2^m$ times the predefined frequency bandwidth of the frequency resource of the physical resource block. This is favorable for increasing a quantity of candidate frequency resources of the synchronization signal, thereby increasing available frequency domain mapping positions for the synchronization signal.

Optionally, a starting frequency domain position or an ending frequency domain position of the target frequency resource aligns with a boundary of the predefined physical resource block.

Optionally, the frequency domain position of the target frequency resource is determined based on the frequency interval of synchronization channels and a preset frequency domain position offset.

Optionally, there is a correspondence between the frequency band used by the system and the frequency domain position offset and/or the frequency interval of synchronization channels, and a value range of m is determined based on the frequency band used by the system.

Optionally, the frequency domain position of the target frequency resource is determined based on the following relationship:

$$p = \text{offset} + n * \text{frequency\_interval}, \text{ where}$$

p is the frequency domain position of the target frequency resource, offset is the frequency domain position offset, n is a preset integer, and frequency_interval is the frequency interval of synchronization channels.

Optionally, n is an integer in an integer set that is determined based on the frequency band used by the system.

Optionally, the predefined frequency bandwidth of the frequency resource of the physical resource block meets the following relational expression:

$$F_{RB} = SCS * N_{SC}^{RB}, \text{ where}$$

$F_{RB}$ is the predefined frequency bandwidth of the frequency resource of the physical resource block, SCS is a predefined subcarrier spacing of the physical resource block, and $N_{SC}^{rRB}$ is a predefined subcarrier quantity of the physical resource block.

Optionally, the predefined subcarrier spacing of the physical resource block is 15 kHz, and the predefined subcarrier quantity of the predefined physical resource block is 12 or 16.

Optionally, the frequency domain position offset is 0 kHz, −7.5 kHz, or 7.5 kHz.

The frequency domain position offset of −7.5 kHz or 7.5 kHz enables an LTE system to coexist with a future system (for example, the 5G system).

Optionally, the frequency domain position of the target frequency resource includes a frequency domain position of a center frequency of the target frequency resource, a frequency domain position of a starting frequency of the target frequency resource, or a frequency domain position of an ending frequency of the target frequency resource.

The foregoing describes the synchronization signal sending method and receiving method according to the embodiments of this application. The following describes a base station and a terminal device according to the embodiments of this application with reference to FIG. 6 to FIG. 9.

FIG. 6 is a schematic structural diagram of a base station 500 according to an embodiment of this application. As shown in FIG. 6, the base station 500 includes a processing unit 510 and a sending unit 520.

The processing unit 510 is configured to determine a target frequency resource, where a frequency domain position of the target frequency resource is determined based on a frequency interval of synchronization channels, the frequency interval of synchronization channels is $2^m$ times a predefined frequency bandwidth of a frequency resource of a physical resource block, and m is a preset nonnegative integer.

The sending unit 520 is configured to send a synchronization signal by using the target frequency resource determined by the processing unit 510.

In this embodiment of this application, the frequency domain position of the frequency resource occupied by the synchronization signal is determined based on the frequency interval of synchronization channels, and the frequency interval of synchronization channels is $2^m$ times the predefined frequency bandwidth of the frequency resource of the physical resource block. This is for the benefit of increasing a quantity of candidate frequency resources of the synchronization signal, thereby increasing available frequency domain mapping positions for the synchronization signal.

It should be understood that the base station 500 according to this embodiment of this application may correspond to the base station in the synchronization signal sending method 200 according to the embodiment of this application, and the foregoing and other operations and/or functions of the units in the base station 500 are respectively intended to implement corresponding processes in the method 200 shown in FIG. 2. For brevity, details are not described herein again.

It should be noted that the processing unit 510 may be implemented by using a processor, and the sending unit 520 may be implemented by using a transmitter. FIG. 7 is a schematic structural diagram of a base station 600 according to an embodiment of this application. As shown in FIG. 7, the base station 600 includes a processor 610, a transmitter 620, a memory 630, and a bus system 640. The processor 610, the transmitter 620, and the memory 630 are connected by using the bus system 640. The memory 630 may be configured to store code or the like executed by the processor 610. The transmitter 620 is configured to send a signal under control of the processor 610.

It should be understood that the base station 600 according to this embodiment of this application may correspond to the base station in the synchronization signal sending method 200 according to the embodiment of this application and the base station 500 according to the embodiment of this application, and the foregoing and other operations and/or functions of the units in the base station 600 are respectively intended to implement corresponding processes in the method 200 shown in FIG. 2. For brevity, details are not described herein again.

Figure 8:
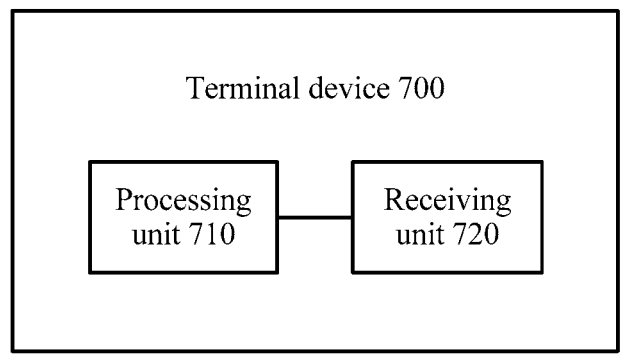
FIG. 8 is a schematic structural diagram of a terminal device according to an embodiment of this application.

FIG. 8 is a schematic structural diagram of a terminal device 700 according to an embodiment of this application. As shown in FIG. 8, the terminal device 700 includes a processing unit 710 and a receiving unit 720.

The processing unit 710 is configured to obtain a target frequency resource, where a frequency domain position of the target frequency resource is determined based on a frequency interval of synchronization channels, the frequency interval of synchronization channels is $2^m$ times a frequency bandwidth of a frequency resource in a predefined physical resource block, and m is a preset nonnegative integer.

The receiving unit 720 is configured to receive, based on the target frequency resource obtained by the processing unit 710, a synchronization signal from a base station.

In this embodiment of this application, the frequency domain position of the frequency resource occupied by the synchronization signal is determined based on the frequency interval of synchronization channels, and the frequency interval of synchronization channels is $2^m$ times the frequency bandwidth of the frequency resource in the predefined physical resource block. This is favorable for increasing a quantity of candidate frequency resources of the synchronization signal, thereby increasing available frequency domain mapping positions for the synchronization signal.

It should be understood that the terminal device 700 according to this embodiment of this application may correspond to the terminal device in the synchronization signal receiving method 400 according to the embodiment of this application, and the foregoing and other operations and/or functions of the units in the terminal device 700 are respectively intended to implement corresponding processes in the method 400 shown in FIG. 5. For brevity, details are not described herein again.

Figure 9:
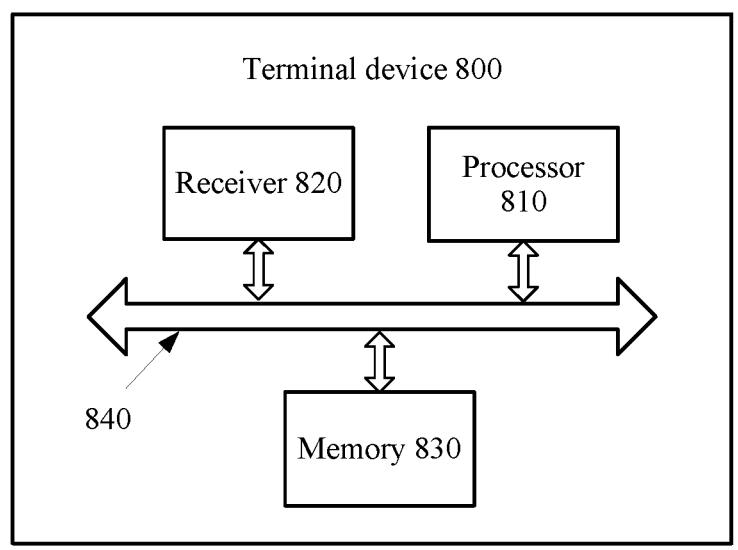
FIG. 9 is a schematic structural diagram of a terminal device according to another embodiment of this application.

It should be noted that the processing unit 710 may be implemented by using a processor, and the receiving unit 720 may be implemented by using a receiver. FIG. 9 is a schematic structural diagram of a terminal device 800 according to another embodiment of this application. As shown in FIG. 9, the terminal device 800 includes a processor 810, a receiver 820, a memory 830, and a bus system 840. The processor 810, the receiver 820, and the memory 830 are connected by using the bus system 840. The memory 830 may be configured to store code or the like executed by the processor 810. The receiver 820 is configured to receive a signal under control of the processor 810.

It should be understood that the terminal device 800 according to this embodiment of this application may correspond to the terminal device in the synchronization signal receiving method 400 according to the embodiment of this application and the terminal device 700 according to the embodiment of this application, and the foregoing and other operations and/or functions of the units in the terminal device 800 are respectively intended to implement corresponding processes in the method 400 shown in FIG. 5. For brevity, details are not described herein again.

It should be noted that in the foregoing embodiments, in addition to including a data bus, the bus system may further include a power bus, a control bus, and a status signal bus. For ease of representation, the various buses are uniformly denoted as the bus system in the figures.

The memory in the foregoing embodiments may include a transitory memory, for example, a random access memory (RAM). The memory may also include a non-transitory memory, for example, a flash memory, a hard disk drive (HDD), or a solid-state drive (SSD). The memory may further include a combination of the foregoing types of memories.

The processor in the foregoing embodiments may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a terminal device based on a frequency interval of synchronization channels, a frequency domain position of a target frequency resource, wherein the frequency interval of synchronization channels is $2^m$ times a predefined frequency bandwidth of a physical resource block, and wherein m is a preset nonnegative integer; and
   receiving, by the terminal device based on the target frequency resource, a synchronization signal from a base station.

2. The method according to claim 1, wherein the frequency domain position of the target frequency resource is determined based on the frequency interval of synchronization channels and a preset frequency domain position offset.

3. The method according to claim 2, wherein the frequency domain position of the target frequency resource meets the following relational expression:

$$p = \text{offset} + n \cdot \text{frequency\_interval},$$

wherein p is the frequency domain position of the target frequency resource, offset is the frequency domain position offset, n is a preset integer, and frequency interval is the frequency interval of synchronization channels.

4. The method according to claim 3, wherein n is an integer in an integer set that is determined based on a frequency band used by a system.

5. The method according to claim 2, wherein there is a correspondence between at least one of a frequency band used by a system and the frequency domain position offset or the frequency interval of synchronization channels, and wherein a value range of m is determined based on the frequency band used by the system.

6. The method according to claim 1, wherein the predefined frequency bandwidth of a physical resource block meets the following relational expression:

$$F_{RB} = SCS \cdot N_{SC}^{RB},$$

wherein $F_{RB}$ is the predefined frequency bandwidth of a physical resource block, wherein SCS is a predefined subcarrier spacing of a physical resource block, and wherein $N_{SC}^{RB}$ is a predefined subcarrier quantity of a physical resource block.

7. The method according to claim 6, wherein the predefined subcarrier spacing of a physical resource block is 15 kHz, and wherein the predefined subcarrier quantity of a physical resource block is 12.

8. The method according to claim 1, wherein the predefined frequency bandwidth of a physical resource block is 180 kHz.

9. The method according to claim 1, wherein the frequency domain position of the target frequency resource is a frequency domain position of a center frequency of the target frequency resource, a frequency domain position of a starting frequency of the target frequency resource, or a frequency domain position of an ending frequency of the target frequency resource.

10. An apparatus, comprising:
    a storage medium including executable instructions; and
    at least one processor;
    wherein the executable instructions, when executed by the at least one processor, cause the apparatus to:
      determine, based on a frequency interval of synchronization channels, a frequency domain position of a target frequency resource, wherein the frequency interval of synchronization channels is $2^m$ times a predefined frequency bandwidth of a physical resource block, and wherein m is a preset nonnegative integer; and
      receive, based on the target frequency resource, a synchronization signal.

11. The apparatus according to claim 10, wherein the frequency domain position of the target frequency resource is determined based on the frequency interval of synchronization channels and a preset frequency domain position offset.

12. The method according to claim 11, wherein the frequency domain position of the target frequency resource meets the following relational expression:

$p$=offset+$n$*frequency_interval, wherein p is the frequency domain position of the target frequency resource, offset is the frequency domain position offset, n is a preset integer, and frequency_interval is the frequency interval of synchronization channels.

13. The apparatus according to claim 12, wherein n is an integer in an integer set that is determined based on a frequency band used by a system.

14. The apparatus according to claim 11, wherein there is a correspondence between at least one of a frequency band used by a system and the frequency domain position offset or the frequency interval of synchronization channels, and a value range of m is determined based on the frequency band used by the system.

15. The apparatus according to claim 10, wherein the predefined frequency bandwidth of a physical resource block meets the following relational expression:

$F_{RB}$=SCS*$N_{SC}^{RB}$, wherein $F_{RB}$ is the predefined frequency bandwidth of a physical resource block, wherein SCS is a predefined subcarrier spacing of a physical resource block, and wherein $N_{SC}^{RB}$ is a predefined subcarrier quantity of a physical resource block.

16. The apparatus according to claim 15, wherein the predefined subcarrier spacing of a physical resource block is 15 kHz, and wherein the predefined subcarrier quantity of a physical resource block is 12.

17. The apparatus according to claim 10, wherein the predefined frequency bandwidth of a physical resource block is 180 kHz.

18. The apparatus according to claim 10, wherein the frequency domain position of the target frequency resource is a frequency domain position of a center frequency of the target frequency resource, a frequency domain position of a starting frequency of the target frequency resource, or a frequency domain position of an ending frequency of the target frequency resource.

19. A non-transitory computer-readable storage medium storing instructions that, when executed by at least one processor, cause a terminal to carry out the following:
determining, based on a frequency interval of synchronization channels, a frequency domain position of a target frequency resource, wherein the frequency interval of synchronization channels is $2^m$ times a predefined frequency bandwidth of a physical resource block, and wherein m is a preset nonnegative integer; and
receiving, based on the target frequency resource, a synchronization signal.

20. The non-transitory computer-readable storage medium according to claim 19, wherein the frequency domain position of the target frequency resource is determined based on the frequency interval of synchronization channels and a preset frequency domain position offset.

21. The non-transitory computer-readable storage medium according to claim 20, wherein the frequency domain position of the target frequency resource meets the following relational expression:

$p$=offset+$n$*frequency_interval, wherein p is the frequency domain position of the target frequency resource, offset is the frequency domain position offset, n is a preset integer, and frequency_interval is the frequency interval of synchronization channels.

22. The non-transitory computer-readable storage medium according to claim 21, wherein n is an integer in an integer set that is determined based on a frequency band used by a system.

23. The non-transitory computer-readable storage medium according to claim 20, wherein there is a correspondence between at least one of a frequency band used by a system and the frequency domain position offset or the frequency interval of synchronization channels, and wherein a value range of m is determined based on the frequency band used by the system.

24. The non-transitory computer-readable storage medium according to claim 19, wherein the predefined frequency bandwidth of a physical resource block meets the following relational expression:

$F_{RB}$=SCS*$N_{SC}^{RB}$, wherein $F_{RB}$ is the predefined frequency bandwidth of a physical resource block, wherein SCS is a predefined subcarrier spacing of a physical resource block, and wherein $N_{SC}^{RB}$ is a predefined subcarrier quantity of a physical resource block.

25. The non-transitory computer-readable storage medium according to claim 24, wherein the predefined subcarrier spacing of a physical resource block is 15 kHz, and wherein the predefined subcarrier quantity of a physical resource block is 12.

26. The non-transitory computer-readable storage medium according to claim 19, wherein the predefined frequency bandwidth of a physical resource block is 180 kHz.

27. The non-transitory computer-readable storage medium according to claim 19, wherein the frequency domain position of the target frequency resource is a frequency domain position of a center frequency of the target frequency resource, a frequency domain position of a starting frequency of the target frequency resource, or a frequency domain position of an ending frequency of the target frequency resource.

* * * * *